United States Patent [19]

Bichel

[11] 4,237,782

[45] Dec. 9, 1980

[54] VEGETABLE PROCESSING MACHINE WITH PRODUCT MOBILIZER APPARATUS

[75] Inventor: Ronald A. Bichel, Neosho, Wis.

[73] Assignee: Starr, Incorporated, Hustisford, Wis.

[21] Appl. No.: 963,794

[22] Filed: Nov. 27, 1978

[51] Int. Cl.³ .............................................. A23N 7/02
[52] U.S. Cl. ........................................ 99/625; 15/3.2; 99/516; 99/626; 99/629; 134/132; 198/676
[58] Field of Search .......... 99/518, 519, 585, 623–626, 99/628–630; 15/3.11, 3.13, 3.14, 3.2, 3.21; 134/65, 132, 133, 134; 198/661, 662, 666, 676

[56] References Cited

U.S. PATENT DOCUMENTS

| | | | |
|---|---|---|---|
| 107,480 | 9/1870 | Glas | 99/518 |
| 586,125 | 7/1897 | Hastings et al. | 134/132 |
| 840,296 | 1/1907 | Caldwell | 99/585 |
| 2,145,882 | 2/1939 | Lathrop | 198/676 |
| 2,690,576 | 10/1954 | Dreesman | 15/3.2 |
| 3,702,128 | 11/1972 | Trotter, Jr. | 198/661 |
| 3,811,000 | 5/1974 | Lazzarini | 99/628 |
| 3,946,658 | 3/1976 | Smith | 99/630 |
| 4,023,477 | 5/1977 | Hirahara et al. | 99/630 |
| 4,132,162 | 1/1979 | Magnuson | 99/630 |

*Primary Examiner*—Harvey C. Hornsby
*Assistant Examiner*—Timothy F. Simone

*Attorney, Agent, or Firm*—Thomas F. Kirby

[57] ABSTRACT

A processing machine for washing, scrubbing, or peeling products, such as vegetables or fruit, comprises a plurality of elongated rotatable processing rollers (with brushes or abrading elements thereon) arranged to define a U-shaped trough through which the products pass for processing. A rotatable waste discharging auger is located below the trough. A rotatable product mobilizer apparatus, comprising a drive shaft, helical rods arranged around and supported on the drive shaft and located in the trough, and augers on the drive shaft at the opposite ends of the helical rods, operates to raise the product layer next to the processing rollers thereby creating a tumbling action, to positively move the products toward the discharge end of the processing rollers, and to control product load level in the trough as a function of the rotational speed of the product mobilizer apparatus. Each processing roller, the waste auger, and the product mobilizer apparatus is rotatably driven by an individual hydraulic motor supplied from a hydraulic pump and speed-regulating flow control valves are provided for the hydraulic motors. One end of each processing roller and one end of the waste auger is rotatably supported by the associated hydraulic motor.

3 Claims, 8 Drawing Figures

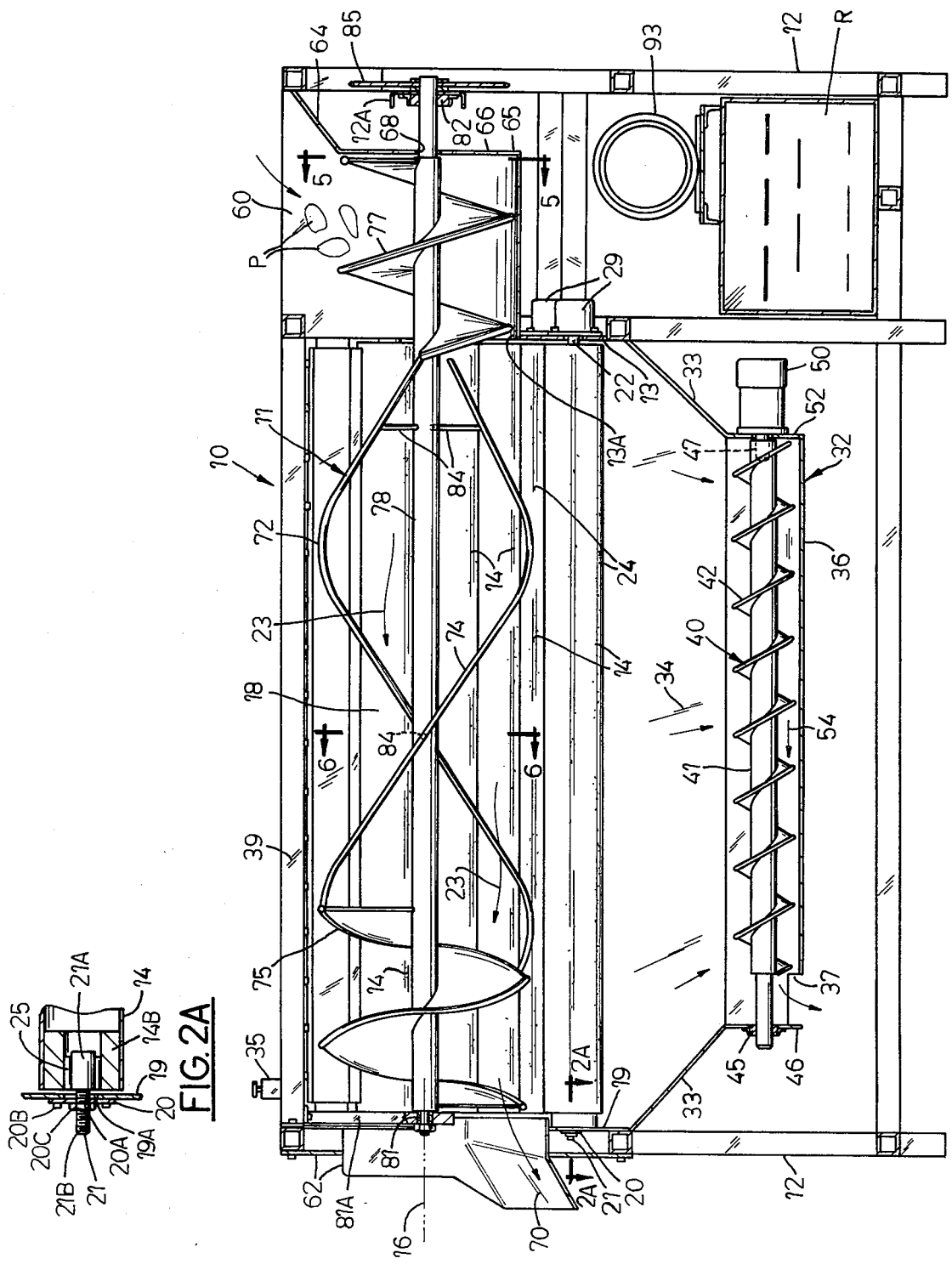

VEGETABLE PROCESSING MACHINE WITH PRODUCT MOBILIZER APPARATUS

BACKGROUND OF THE INVENTION

1. Field of Use

This invention relates generally to machines for processing products, such as vegetables, fruit, or the like, by washing, scrubbing, abrading, peeling or the like, by means of rotatable processing rollers having brushes or abrading elements thereon. In particular, it relates to such machines having apparatus therein for controlling the product flow therethrough.

2. Description of the Prior Art

In some prior art processing machines of the aforesaid character, wherein one or more elongated rotatable processing rollers are provided, rotatable auxiliary rollers or drums having helically-shaped elements embodied therein are also provided to advance the products along the processing rollers and through the machine. Typically, the processing rollers and auxiliary rollers or drums are driven by complex chain drives, pulleys and V-belts, or geared drives. U.S. Pat. Nos. 3,750,211; 3,747,149; 2,824,318; and 1,407,501 illustrate the state of the art. In one type of prior art machine presently in use, a plurality of elongated processing rollers are arranged to define a generally U-shaped sloped trough in which the products are deposited for processing and from which they exit by the force of gravity. In the latter machine, there is a tendency for the product layer adjacent the rollers and those products at the bottom of the trough to remain there too long, and this results in nonuniform processing and excessive product waste. Furthermore, in the latter machine, passage of the products therethrough depends on gravity and there is no effective way to control product flow rate other than to change the slope of the trough. Also, there is no practical way to control the product load level within the trough other than to control the amount of product introduced.

SUMMARY OF THE PRESENT INVENTION

In accordance with the present invention, there is provided a machine for processing vegetables by washing, scrubbing, or peeling the same which comprises a plurality of elongated cylindrical parallel driven brushes (or abrasive rollers) which are arranged to form a U-shaped trough in which vegetables are tumbled and processed as they move from the input end to the discharged end of the machine. A product mobilizer comprising a drive shaft and one or more helically-shaped rotatable rods arranged around and supported on the drive shaft is located in the trough and operates to lift upwardly the vegetable layer next to brushed thereby creating a tumbling action and to move the vegetables positively toward the discharge end of the machine. The product mobilizer also comprises an auger connected to the drive shaft at the discharge end of the rods and rotatable therewith for controlling the load level of the machine in response to the speed at which the product mobilizer is rotatably driven. The product mobilizer further comprises another auger connected to the drive shaft at the input end of the rods and rotatable therewith to expedite entry and passage of the product through the machine. A waste auger is located below the trough to recover and remove waste which fall between the product rollers defining the trough. Each processing roller, the product mobilizer apparatus and the waste auger is driven by a separate hydraulic motor and operating fluid for the hydraulic motor is supplied from a hydraulic pump driven by an electric motor. Flow control valves are provided for each hydraulic motor to enable speed control thereof. One end of each processing roller and one end of the waste auger is rotatably supported by its associated hydraulic motor.

A processing machine in accordance with the invention offers numerous advantages over the prior art. For example, the helical rods of the product mobilizer apparatus reach down and lift the product layer adjacent the processing rollers to improve or increase the tumbling action of the products in the trough thereby ensuring that the products are more uniformly and rapidly processed by the processing rollers and with less waste than heretofore. The helical rods also expedite and positively move the products in the trough axially along the processing rollers. The auger at the infeed end of the product mobilizer apparatus also operates effectively to positively and evenly feed the products into the trough. The auger at the discharge end of the product mobilizer positively discharges the products from the trough and, depending on an increase or decrease in its rotational speed, can decrease or increase, respectively, the quantity of products left in the trough and thereby serves as a means for regulating or controlling the product load within the machine at any given time. Furthermore, the depth (i.e., weight) of the product load or load level also effects the pressure at which the products are pressed against the processing rollers and, thus, determines the aggressiveness of the action of the processing rollers on the products. Thus, the speed of rotation of the discharge auger also determines the degree or extent of processing.

The use of individual and independently controllable hydraulic motors for the processing rollers, product mobilizer apparatus, and waste auger also offers many advantages over prior art drive systems. For example, as hereinbefore mentioned, the control of the rotation speed of the product mobilizer controls product load and the degree of processing. The ability to control processing roller speed independently of product mobilizer speed also enables additional control over processing, i.e., more or less scrubbing or abrasion of the product, depending on processing roller speed.

The product mobilizer apparatus in accordance with the invention can be installed on processing machines during manufacture thereof or can be retrofitted in machines already in the field.

The use of independently driven hydraulic motors for the processing rollers and the product mobilizer apparatus eliminates the need for costly and complex chain, belt, or gear drives and facilitates retrofitting, as well as subsequent repair and servicing of the equipment.

Other objects and advantages of the invention will hereinafter appear.

BRIEF DESCRIPTION OF THE DRAWINGS

FIG. 2 is a side elevational view, partly in cross section, of the machine shown in FIG. 1;

FIG. 2A is an enlarged cross-sectional view of one end of a processing roller taken on line 2A—2A of FIG. 2;

DESCRIPTION OF A PREFERRED EMBODIMENT

Figure 1:
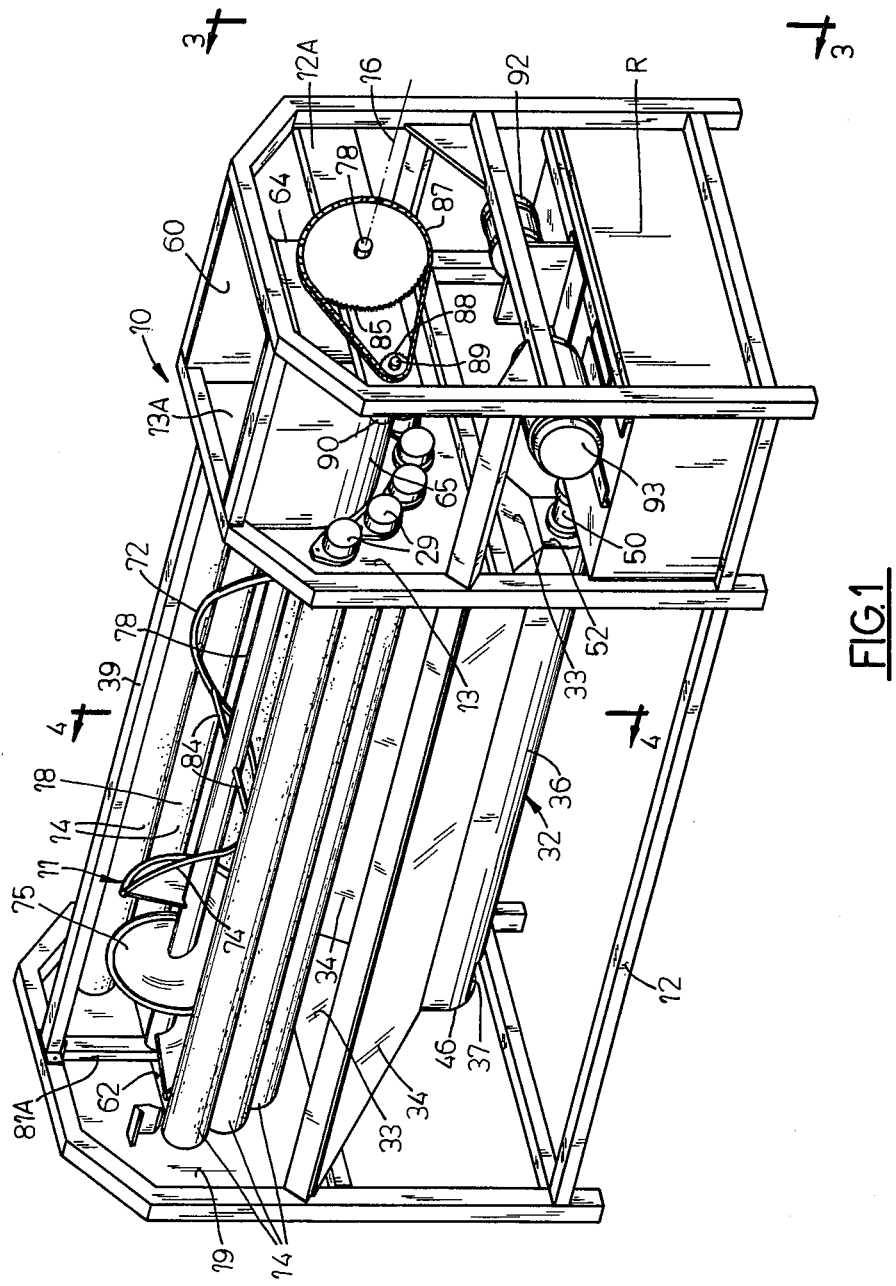
FIG. 1 is a perspective view of a vegetable processing machine having product mobilizer apparatus in accordance with the invention.
Figure 3:
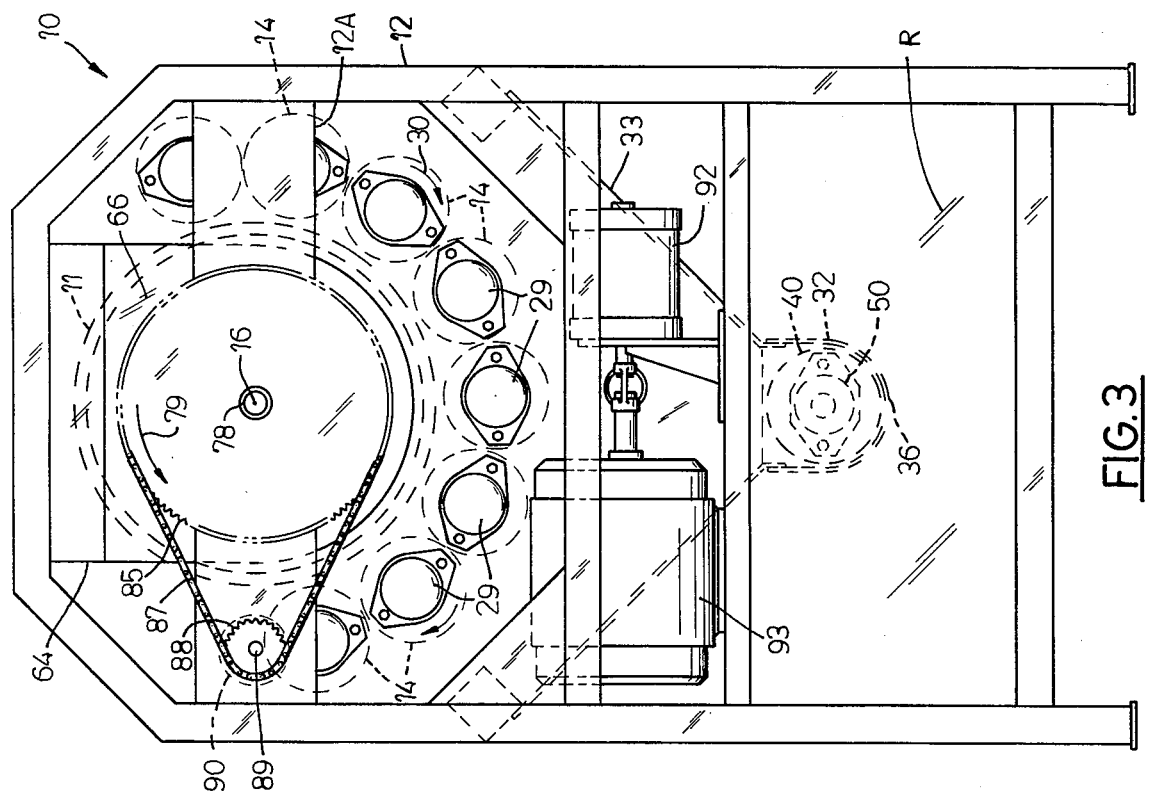
FIG. 3 is an enlarged end elevational view, taken on line 3—3 of FIG. 1.
Figure 5:
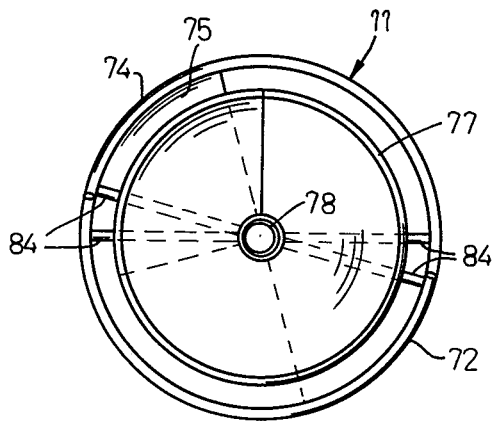
FIG. 5 is an end elevational view taken on line 5—5 of FIG. 2 of the product mobilizer apparatus shown in FIG. 2.
Figure 6:
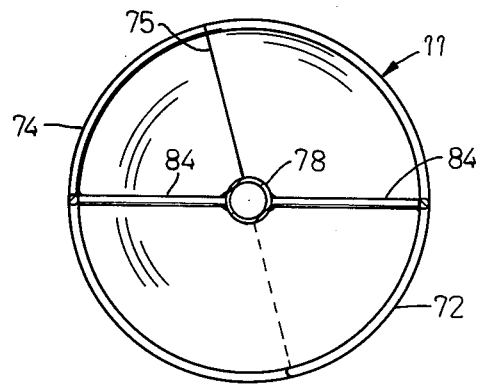
FIG. 6 is a cross-sectional view of the product mobilizer taken on line 6—6 of FIG. 2.

Referring to FIGS. 1, 2, and 3, the numeral 10 designates a processing machine having product mobilizer apparatus 11 in accordance with the invention. Machine 10 is especially well adapted to perform processing operations, such as washing, scrubbing, abrading, peeling, or the like, on products, such as vegetables, fruits, or the like, and especially potatoes, carrots, or beets.

Figure 4:
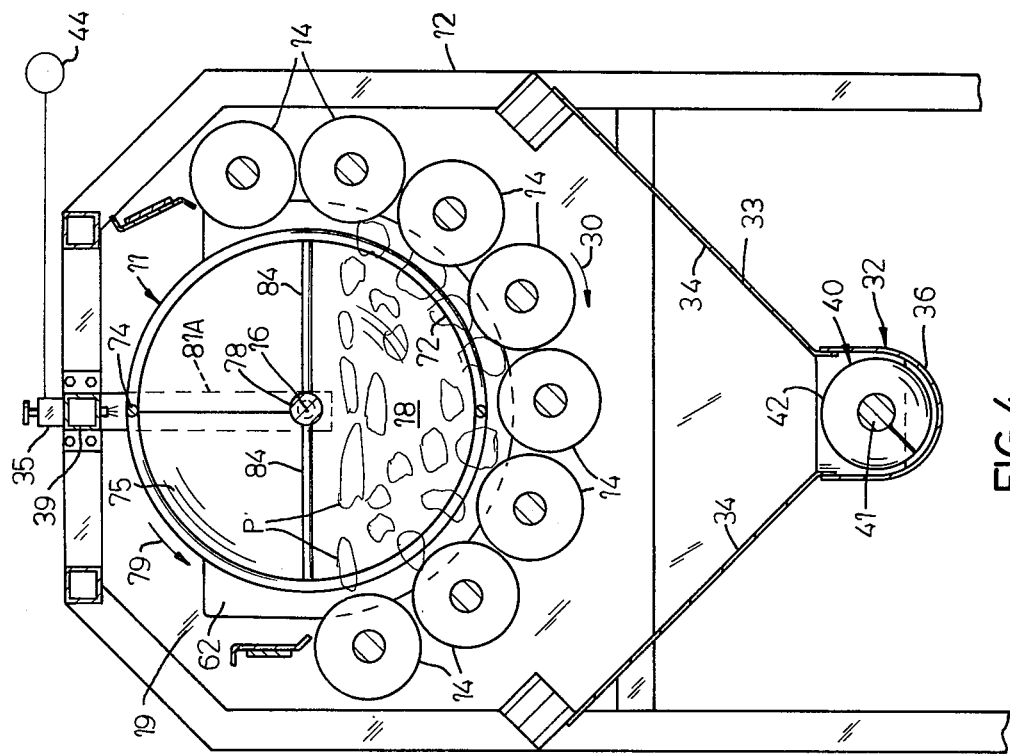
FIG. 4 is an enlarged cross-sectional view taken on line 4—4 of FIG. 1.

Machine 10 generally comprises a framework 12 on which a plurality of elongated rotatable driven processing rollers 14 are arranged about a horizontal axis 16 in parallel relationship to each other and to the axis 16 to define a generally U-shaped trough 18 through which products P pass for processing in the direction of arrow 23. The inlet and discharge ends of trough 18 are closed by end plates 13 and 19 which are mounted on framework 12. Framework 12 is provided with housing panels (not shown) which enclose the unit. Each processing roller 14, which takes the form of a hollow cylinder, comprises roller shafts 21 and 22 at the opposite ends thereof and is provided with abrading elements 24 or some other type of brushes (not shown). Shaft 21 of each roller 14 comprises a cylindrical portion 21A which is rotatably supported or journalled in an antifriction bearing 25 which is mounted in a sleeve 14B which is secured within the end of hollow cylindrical roller 14. Shaft 21 also comprises a threaded portion 21B which extends through an opening 19A in end plate 19 and through an opening 20A in a plate 20 which is secured by screws 20B to plate 19. A nut 20C on shaft 21 secures the stub shaft 21 against rotation. The other shaft 22 of each roller 14 is connected to a hydraulic motor 29 which is mounted on framework 12. Thus, each motor 29 physically supports and rotatably drives its associated roller 14 in the direction of the arrow 30 (see FIGS. 3 and 4). In the embodiment shown, eight processing rollers 14 and eight hydraulic motors 29 are provided.

The rollers 14 in each pair of adjacent rollers are spaced apart sufficiently to allow waste material brushed or scraped from the vegetables in the trough to be flushed therethrough into a waste disposal means 32 which is disposed beneath the rollers 14 and mounted on framework 12, by water injected from a spraying apparatus in the form of a hollow tube 39 mounted on framework 12 and located above the trough 18. Spraying apparatus 39, which includes a water flow control valve 35, is supplied with water from a water supply 44. The waste disposal means 32 comprises a waste hopper 33 which is rigidly mounted on framework 12 and which comprises downwardly and inwardly sloped side walls 34 and a semi-cylindrical waste trough 36 located at the bottom of the walls. Waste trough 36 has a waste discharge opening 37 at the discharge end of the trough.

A waste auger 40 is rotatably mounted in waste trough 36 and comprises a rotatable shaft 41 having an auger flight 42 secured thereto. Shaft 41 of waste auger 40 is supported in an antifriction bearing 45 which is mounted on a plate 46 defining one end of waste trough 36. The other end of shaft 41 of waste auger 40 is connected to the drive shaft 47 of a hydraulic motor 50 which is mounted on a plate 52 defining the other end of waste trough 36. Motor 50 physically supports and rotatably drives its associate waste auger 40 in the direction of arrow 54 (see FIG. 2) to discharge the waste material which collects in waste trough 36.

Machine 10 comprises a product inlet or infeed opening 60 at one end thereof and a product outlet or discharge trough 62 at the opposite end thereof. Infeed opening 60 is located on the upper side of framework 12 and communicates with an inlet hopper 64 which is mounted on framework 12 below opening 60. Inlet hopper 64 comprises a semi-cylindrical inlet trough 65 which is closed at one end by an end plate 66 which has a shaft-receiving hole 68 therethrough. The other end of inlet hopper 64 is open and communicates through an opening 13A in end plate 13 with the inlet end of trough 18. Discharge trough 62 is located on the end of frame 12. Discharge trough 62 has a product discharge chute 70 which extends through end plate 19 to the end of rollers 14 to receive the product P from trough 18 for discharge.

The product mobilizer apparatus 11 for machine 10 generally comprises a pair of elongated rotatable driven helically-shaped three-quarter flight stainless steel rigid rods 72 and 74, which are rotatable in trough 18 about the horizontal axis 16 hereinbefore mentioned; a rotatable driven one and one-half flight discharge auger 75 which is rotatable in trough 18 at the discharge end thereof; and a rotatable driven two-flight infeed auger 77 which is rotatable in inlet hopper 64. The helical rods 72 and 74, the discharge auger 75 and the infeed auger 77 are connected to and rotatable with a common drive shaft 78 in the direction of arrow 79 (see FIGS. 3 and 4). The opposite ends of shaft 78 are supported on antifriction bearings 81 and 82, respectively. Bearing 81 is supported on a bracket 81A which is mounted on framework 12. Bearing 82 is mounted on channel 12A of frame 12. Each helical rod 72, 74 is connected to shaft 78 by two pairs of support rods 84 of appropriate length. The end of drive shaft 78 which extends through hole 68 in end plate 66 is connected to and driven by a drive sprocket 85. Driven sprocket 85 is connected by an endless flexible drive chain 87 to a drive sprocket 88 which is mounted on and rotatable with the drive shaft 89 of a hydraulic motor 90 which is mounted on framework 12.

Figure 7:
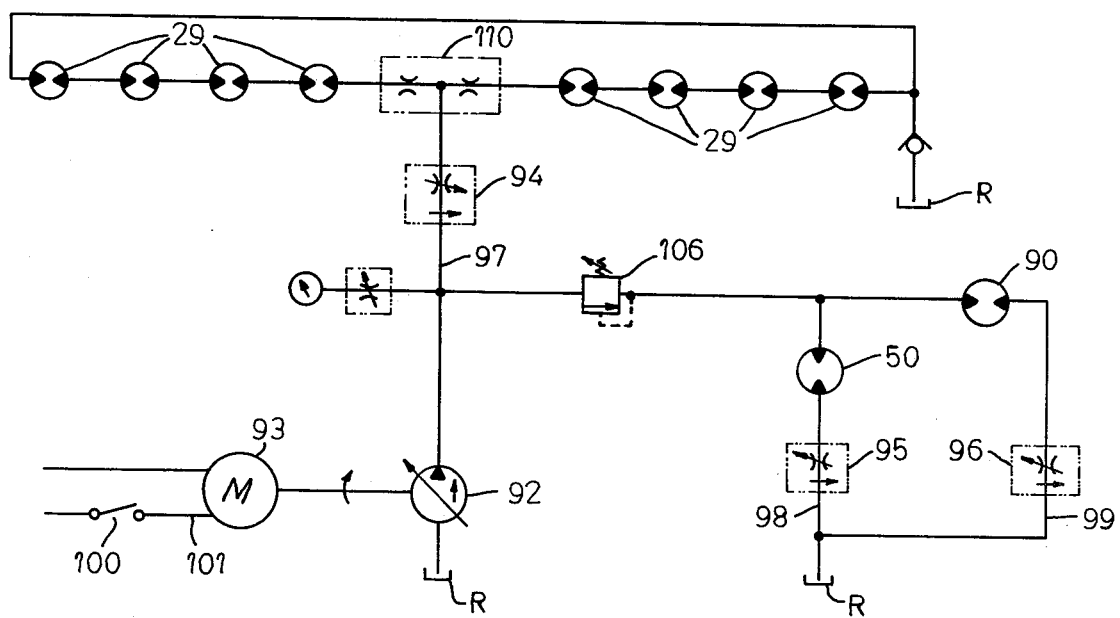
FIG. 7 is a diagrammatic view of a control system for the processing machine in accordance with the present invention.

As FIG. 7 shows, the drive and control system for machine 10 includes a hydraulic pump 92 for supplying hydraulic fluid to operate the hydraulic motors 29, 50, and 90. Pump 92, which is mounted on reservoir R, is driven by an electric motor 93 which is also mounted on reservoir R. Adjustable flow control valves 94, 95, and 96 are provided in the fluid supply lines 97, 98, and 99, respectively, for the hydraulic motors 29, 50, and 90, respectively, to control the rotational speed thereof. A flow divider 110 is connected in the hydraulic circuit between valve 94 and the motors 29. A pressure relief valve 106 is connected in the hydraulic circuit between pump 92 and the motors 50 and 90. An on-off switch 100 is provided for in the electrical supply line 101 for electric motor 93. The hydraulic pump 92 and electric motor 93 are mounted on a tank or reservoir R which is mounted to frame 12.

Operation

The machine 10 operates as follows. Assume that switch 100 is closed, electric motor 93 is energized and rotating, pump 92 is rotating and supplying fluid through the flow (speed) control valve 94, and through pressure relief valve 106 and flow control valve 94, to the hydraulic motors 29, 50, and 90, respectively, and that the processing rollers 14, the waste auger 40, and the product mobilizer apparatus 11 are rotating. Also assume that the flow control valves 94, 95, and 96 are set or adjusted to operate their respective components at a desired rotational speed, i.e., 0 to 500 rpm for the processing rollers 14, about 50 rpm for waste auger 40, and about 1 to 12 rpm for the product mobilizer apparatus 11. Further assume that water flow control valve 35 is open and that the spraying apparatus 39 is in operation.

Now assume that products, such as potatoes, which are to be washed and peeled, are supplied through infeed opening 60 into inlet hopper 64. As this occurs, infeed auger 77 moves the products into the processing trough 18 wherein the processing rollers 14 engage and act upon (by brushing, scraping, or abrading) the products therein. As the helical rods 72 and 74 rotate, they pass through and under the products, causing the product layer next to the processing rollers 14 to be moved upwardly. This creates a positive tumbling action which ensures that all products and all sides thereof are exposed to processing roller action. The rods 72 and 74 also cause the products to move positively through trough 18 from the infeed toward the discharge end thereof. The auger 75 at the discharge end of the product mobilizer positively discharges the products from the trough 18 and, depending on an increase or decrease in its rotational speed, can decrease or increase, respectively, the quantity of products left in the trough, and thereby serves as a means for regulating or controlling the product load within the machine at any given time. Furthermore, the depth of the load in trough 18 is important because the weight of the product on the processing rollers 14 determines the degree of aggressiveness of the roller action on the products. The products are moved by discharge auger 75 through discharge trough 62 onto discharge chute 70 from whence they are loaded into bins (not shown) or onto a discharge conveyor (not shown).

As processing occurs in trough 18, the water from spray apparatus 39 washes the waste material brushed or abraded from the products between the processing rollers 14 into the waste hopper 33 from which it is expelled through opening 37 by waste auger 40.

I claim:

1. In a machine for processing products such as fruits and vegetables or the like:
   a plurality of elongated rotatable processing rollers arranged about a common axis to define a generally U-shaped trough open at its top and having an infeed end and a discharge end, each roller having a fixed position relative to said trough but being rotatable about its own axis;
   first drive means for rotating said rollers about their own axes;
   a rotatable product mobilizer for association with said rollers and comprising at least one rod forming a helix rotatable in said trough about said common axis to lift upwardly the products thereby creating a tumbling action, rotatable auger means in said trough between said product mobilizer and said outlet end thereof;
   second drive means for rotating said product mobilizer and said auger;
   and control means for controlling said second drive means to regulate the rotational speed of said auger means and thereby control the product load within said machine, further including rotatable anger means between said infeed end of said trough and said product mobilizer, wherein said product mobilizer includes a rotatable shaft, wherein said rod is arranged around and spaced from said shaft, and further including rod support means connected between said rod and said shaft, and wherein said auger means are connected to said shaft.

2. A machine according to claim 1 wherein said product mobilizer comprises at least two rods, each forming a helix.

3. A machine according to claims 2 or 1 wherein said machine includes a framework and wherein said first drive means includes a motor for each processing roller, and wherein each said motor is mounted on said framework and rotatably supports an end of one of said rollers, the other end of each roller being rotatably mounted on said framework.

* * * * *